(12) United States Patent
Miyagi et al.

(10) Patent No.: US 11,181,897 B2
(45) Date of Patent: Nov. 23, 2021

(54) DAMAGE PROBABILITY CALCULATION DEVICE AND DAMAGE PROBABILITY CALCULATION METHOD

(71) Applicant: MITSUBISHI HEAVY INDUSTRIES, LTD., Tokyo (JP)

(72) Inventors: Yoshitomo Miyagi, Tokyo (JP); Toshinobu Ohara, Tokyo (JP); Hideaki Kaneko, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 215 days.

(21) Appl. No.: 16/294,251

(22) Filed: Mar. 6, 2019

(65) Prior Publication Data

US 2019/0294157 A1   Sep. 26, 2019

(30) Foreign Application Priority Data

Mar. 22, 2018   (JP) .............................. JP2018-054682

(51) Int. Cl.
*G05B 23/02*    (2006.01)
*G06N 7/00*    (2006.01)

(52) U.S. Cl.
CPC ....... *G05B 23/024* (2013.01); *G05B 23/0283* (2013.01); *G06N 7/005* (2013.01)

(58) Field of Classification Search
CPC ... G05B 23/024; G05B 23/0283; G06N 7/005
See application file for complete search history.

(56) References Cited

U.S. PATENT DOCUMENTS

2003/0191606 A1* 10/2003 Fujiyama ............... G06Q 10/06
                                                              702/185
2009/0299696 A1* 12/2009 Shiihara ................. G06Q 10/10
                                                              702/181

(Continued)

FOREIGN PATENT DOCUMENTS

CN    106777814    *  5/2007    ............. G06F 17/50
JP    2012-113708        6/2012

(Continued)

OTHER PUBLICATIONS

Weibull ("Confidence Intervals on Stress-Strength Analysis in Weibull ++", Sep. 2014) (Year: 2014).*

*Primary Examiner* — Catherine T. Rastovski
*Assistant Examiner* — Aeysha N Sultana
(74) *Attorney, Agent, or Firm* — Wenderoth, Lind & Ponack, L.L.P.

(57) ABSTRACT

A damage probability calculation device which calculates a damage probability in an evaluation target region of a gas turbine computes strength distributions including a mean, a standard deviation and a certainty factor of the strength of a material used for the evaluation target region with respect to stresses on the basis of strength test data of the material. In addition, the damage probability calculation device computes stress distributions including the mean, the standard deviation and the certainty factor of stresses input to the evaluation target region on the basis of operation data of the gas turbine acquired through a sensor. Further, the damage probability calculation device computes damage probability distributions indicating distributions of damage probabilities of the evaluation target region on the basis of the strength distributions and the stress distributions.

4 Claims, 11 Drawing Sheets

(56) References Cited

U.S. PATENT DOCUMENTS

2012/0130688 A1    5/2012  Jiang et al.
2013/0298691 A1*  11/2013  Shimanuki ............... G01N 3/02
                                                                73/788

FOREIGN PATENT DOCUMENTS

JP         2014-164322        9/2014
JP           201552487 A  *   3/2015

* cited by examiner

DAMAGE PROBABILITY CALCULATION DEVICE AND DAMAGE PROBABILITY CALCULATION METHOD

TECHNICAL FIELD

The present disclosure relates to a damage probability calculation device and a damage probability calculation method. Priority is claimed on Japanese Patent Application No. 2018-054682, filed Mar. 22, 2018, the content of which is incorporated herein by reference.

BACKGROUND ART

Health monitoring and condition based maintenance (CBM) of gas turbines using a condition monitoring system (CMS) have progressed (for example, refer to Patent Literature 1).

CITATION LIST

Patent Literature

[Patent Literature 1] Japanese Unexamined Patent Application, First Publication No. 2012-113708

SUMMARY

Prediction of the lifespan of high-temperature components of a gas turbine is based on an equivalent driving formula (how many hours the component has been driven, how many times the component has been started, and the like), for example, and data of momentarily changing driving conditions is not sufficiently reflected therein. In addition, since the lifespan may be set excessively on a safe side on the assumption of harsh conditions, for example, without taking the operating conditions for each plant into account in detail, early component purchase and unplanned repairing may frequently occur in a long-term maintenance contract.

An object of the present disclosure is to provide a damage probability calculation device and a damage probability calculation method for facilitating appropriate maintenance management in accordance with operating conditions of a client.

According to an aspect of the present disclosure, a damage probability calculation device is a damage probability calculation device for calculating a damage probability in an evaluation target region of a machine and includes: a strength distribution computation unit configured to compute strength distributions including a mean, a standard deviation and a certainty factor of the strength of a material used for the evaluation target region on the basis of test data of the strength of the material with respect to stresses; a stress distribution computation unit configured to compute stress distributions including the mean, the standard deviation and a certainty factor of stresses input to the evaluation target region on the basis of operation data of the machine acquired through a sensor; and a damage probability distribution computation unit configured to compute damage probability distributions indicating distributions of damage probabilities of the evaluation target region on the basis of the strength distributions and the stress distributions.

According to the above-described aspect of the present disclosure, appropriate maintenance management in accordance with operating conditions of a client is facilitated.

DESCRIPTION OF EMBODIMENTS

First Embodiment

Hereinafter, a damage probability calculation device according to a first embodiment will be described with reference to FIG. 1 to FIG. 11.

(Functional configuration of damage probability calculation device)

Figure 1:
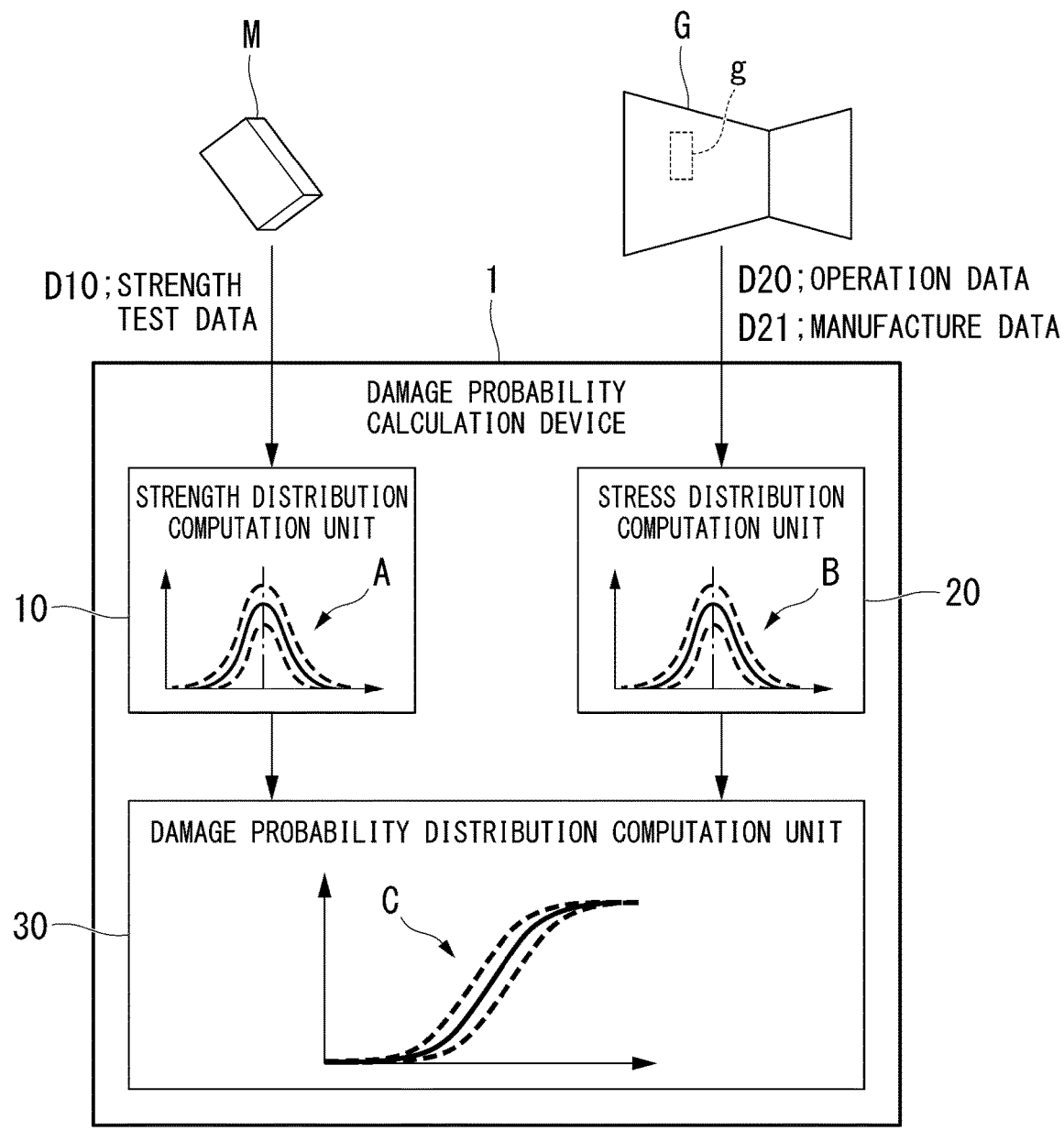
FIG. 1 is a diagram showing a functional configuration of a damage probability calculation device according to a first embodiment.

FIG. 1 is a diagram showing a functional configuration of the damage probability calculation device according to the first embodiment.

The damage probability calculation device 1 shown in FIG. 1 is a device that calculates a damage probability in an evaluation target region g of a gas turbine G which is a monitoring target. The gas turbine G is one aspect of machinery. Although a case in which a machine that is a monitoring target is a rotary machine is described in the present embodiment, the machine that is a monitoring target may be a machine other than rotary machines. The evaluation target region g is a high-temperature component or the like of the gas turbine G and is a region that particularly requires maintenance and exchange according to operation. For example, the evaluation target region g is a moving blade, a stationery blade, or the like.

The damage probability calculation device 1 includes a strength distribution computation unit 10, a stress distribution computation unit 20, and a damage probability distribution computation unit 30.

The strength distribution computation unit 10 computes strength distributions A including the mean, the standard deviation and a certainty factor of the strength of a material M used for the evaluation target region g with respect to stresses on the basis of test data D10 which is strength test results of the strength of the material M with respect to stresses.

The stress distribution computation unit 20 computes stress distributions B including the mean, the standard deviation and a certainty factor of stresses input to the evaluation target region g on the basis of operation data D20 and manufacture data D21 of the gas turbine G.

The damage probability distribution computation unit 30 computes damage probability distributions C indicating distributions of damage probabilities of the evaluation target region g on the basis of the strength distributions A and the stress distributions B.

(Processing flow of damage probability calculation device)

Figure 2:
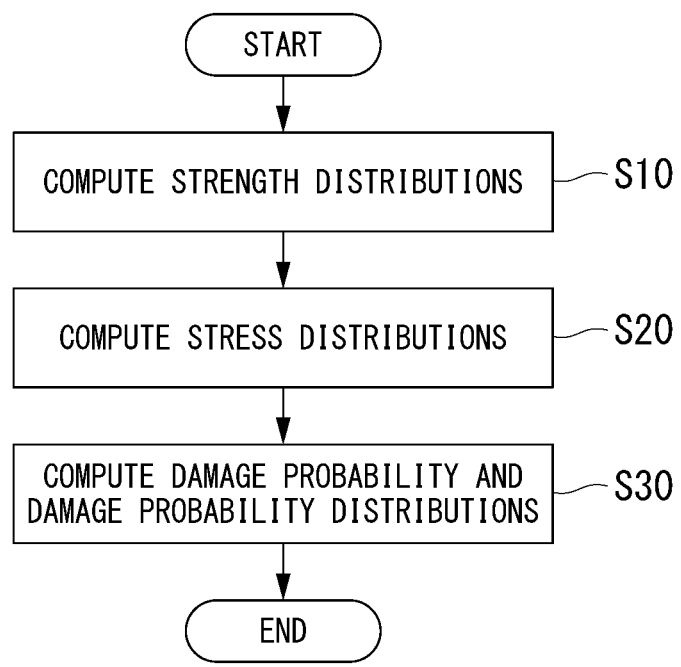
FIG. 2 is a diagram showing a processing flow of the damage probability calculation device according to the first embodiment.

FIG. 2 is a diagram showing a processing flow of the damage probability calculation device according to the first embodiment.

In addition, FIG. 3 to FIG. 11 are diagrams for describing processing of the damage probability calculation device according to the first embodiment in detail.

The processing flow shown in FIG. 2 is executed by the damage probability calculation device 1 in order to compute a damage probability and a damage probability distribution with respect to the gas turbine G in a certain number of operating cycles/operating time.

(Detailed Description of Processing of Strength Distribution Computation Unit)

First, the strength distribution computation unit 10 of the damage probability calculation device 1 computes strength distributions A with respect to the material M of the evaluation target region g (step S10). Hereinafter, the process of step S10 performed by the strength distribution computation unit 10 will be described in detail with reference to FIG. 3 and FIG. 4.

Figure 3:
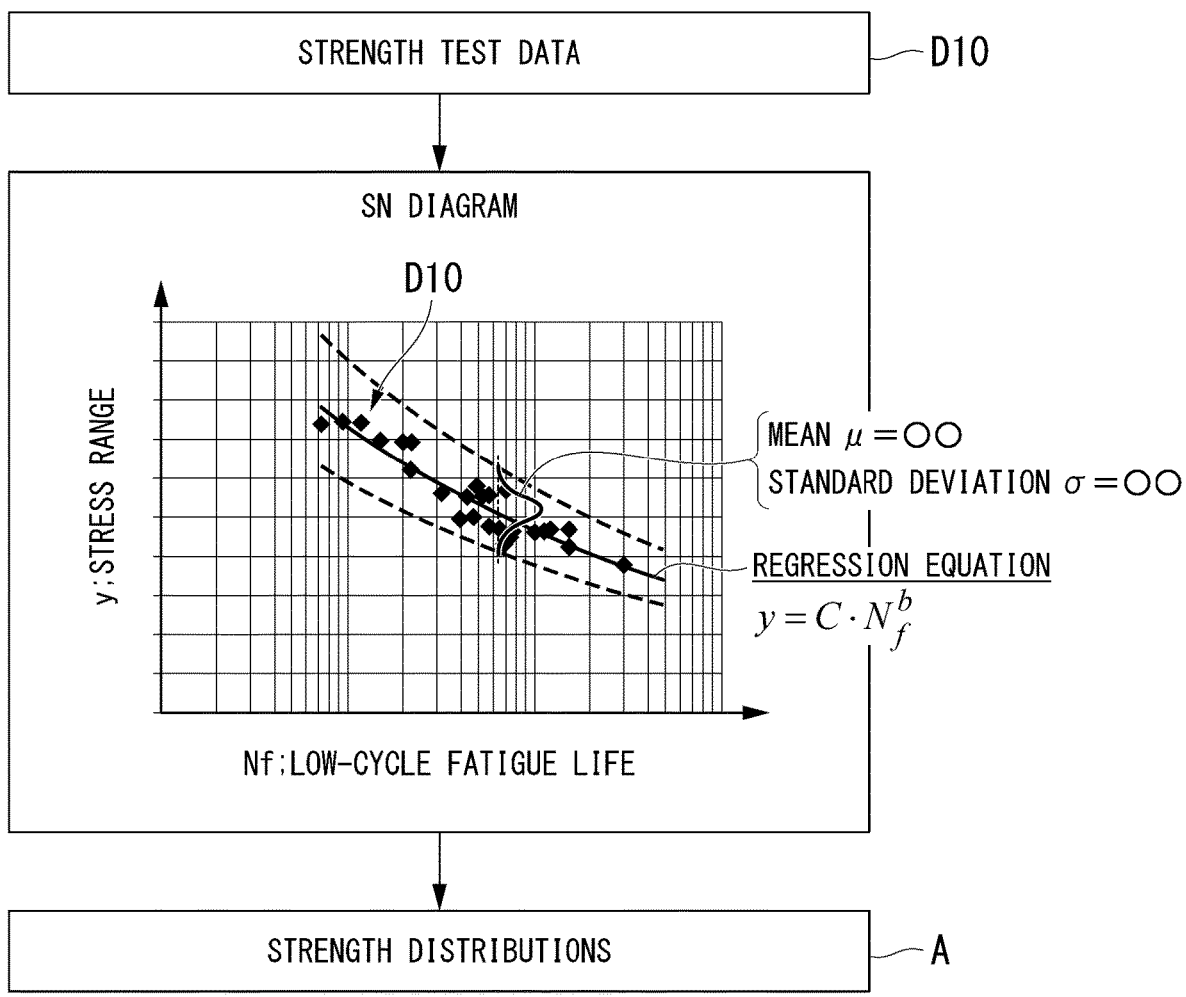
FIG. 3 is a first diagram for describing processing of the damage probability calculation device according to the first embodiment in detail.

FIG. 3 shows a flow through which the strength distributions A are acquired from the strength test data D10 through processing of the strength distribution computation unit 10. As shown in FIG. 3, the strength distribution computation unit 10 acquires the strength test data D10. For example, the strength test data D10 is test data representing results of a low-cycle fatigue life test and a creep rupture test with respect to the material M.

For example, when the strength test data D10 is test data of a low-cycle fatigue lift test, the strength test data D10 is represented as an SN diagram shown in FIG. 3. The SN diagram shows the characteristic of the material M that the material M breaks (comes to the end of its lifetime) when a stress range y (vertical axis) is input "Nf" times (horizontal axis) for the material M.

A low-cycle fatigue life Nf is modelled as a fatigue life relational expression as represented by expression (1), for example.

$$\frac{1}{2}E\Delta\varepsilon = \frac{E}{4}N_f^{-1/2}\varepsilon_f + \frac{\Delta\sigma}{2} \quad (1)$$

In expression (1), "E" is the Young's modulus, "$\Delta\varepsilon$" is a strain range, "$\varepsilon_f$" is a breaking strain, and "$\Delta\sigma$" is a stress range.

The strength distribution computation unit 10 performs regression analysis using a regression equation ($y=C\cdot Nf^b$) based on expression (1) for the strength test data D10. As a result, the strength distribution computation unit 10 computes the mean μ and the standard deviation σ of stress ranges y corresponding to the number of operating cycles (low-cycle fatigue life NO of the gas turbine G.

Further, the strength distribution computation unit 10 according to the present embodiment computes a certainty factor (a prior distribution) with respect to the mean and the standard deviation σ of stress ranges on the basis of the Bayes estimation. Here, it is assumed that a distribution of parameters taken into account in order to compute a damage probability of the gas turbine G is either of a normal distribution and a distribution which can be converted into a normal distribution, such as a logarithmic normal distribution. In general, a natural conjugate prior distribution of the standard deviation σ when a population conforms to a normal distribution is a reverse chi-square distribution and a natural conjugate prior distribution of the mean μ is a normal distribution for a conditional probability given a variance σ2 (the natural conjugate prior distribution is a prior distribution in which forms of probability density distribution expressions are consistent with each other in a prior distribution and a posterior distribution). That is, the natural conjugate prior distribution of the mean μ and the natural conjugate prior distribution of the standard deviation α are respectively represented by expressions (2) and (3).

$$p\left(\mu \mid \frac{\sigma^2}{n_0}\right) = N\left(\mu_0, \frac{\sigma^2}{n_0}\right) \quad (2)$$

$$p(\sigma^2) = \chi^{-2}(v_0, \lambda_0) \quad (3)$$

In expression (2), "N" is a normal distribution. "$\mu_0$" is a mean value and is given a sample mean of the strength test data D10. In addition, "$\sigma^2$" is a variance and is given a sample variance of the strength test data D10. Further, "$n_0$" is a degree of freedom and is given the number of pieces of data of the strength test data D10.

In expression (3), "$\chi^{-2}$" is a reverse chi-square distribution. "$v_0$" is a degree of freedom and is given the number of pieces of data of the strength test data D10. In addition, "$\lambda_0$" is a scale parameter and is given the sample variance $\sigma^2 \times v_0$ of the strength test data D10, for example.

Figure 4:
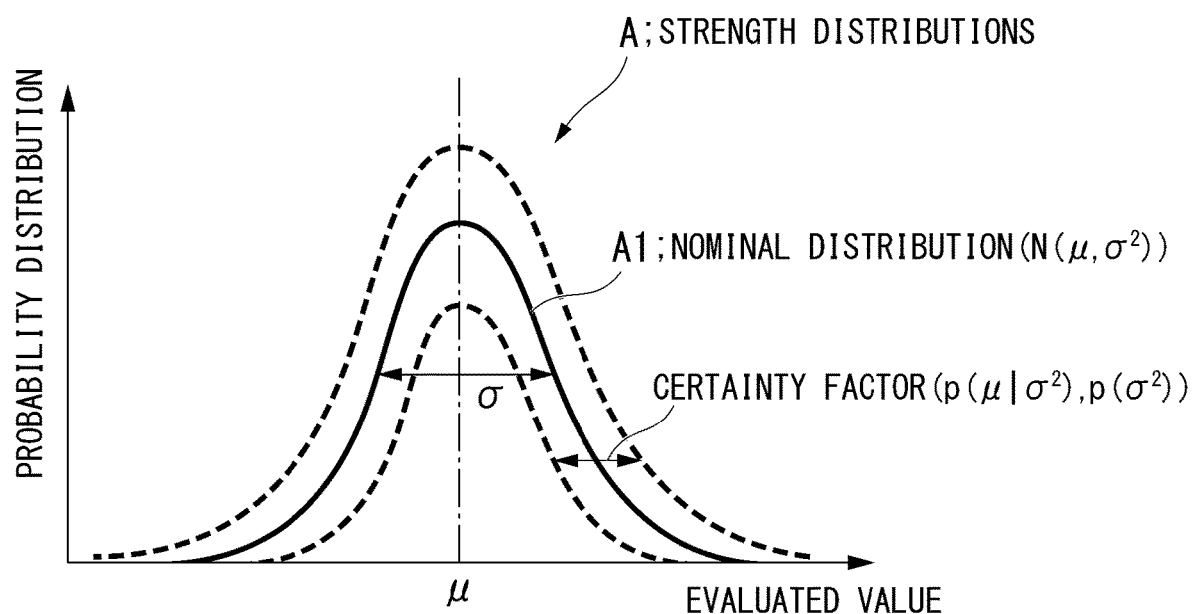
FIG. 4 is a second diagram for describing processing of the damage probability calculation device according to the first embodiment in detail.

When prior distributions representing certainty factors of the mean μ and the standard deviation α shown in expressions (2) and (3) are applied to the normal distributions N of the mean μ and the standard deviation σ, strength distributions A shown in FIG. 4 are obtained. A distribution indicated by a solid line among the distributions shown in FIG. 4 is the normal distribution (nominal distribution A1) of the mean μ and the standard deviation σ. A range indicated by dotted lines in the distributions shown in FIG. 4 represents a range in which the normal distribution of the mean μ and the standard deviation σ varies according to degrees (natural conjugate prior distribution) of variations in the mean μ and the standard deviation σ.

In this manner, the strength distributions A indicate the mean, the standard deviation and a certainty factor of an evaluated value (for example, strength with respect to stresses) in the evaluation target region g.

Meanwhile, although an example in a case in which the strength test data D10 is test data of a low-cycle fatigue life test has been described in FIG. 3 and FIG. 4, the strength distribution computation unit 10 may further perform the same processing on test data of a creep rupture test to acquire strength distributions A with respect to the creep rupture life of the material M.

(Detailed Description of Processing of Stress Distribution Computation Unit)

Referring back to FIG. 2, next, the stress distribution computation unit 20 of the damage probability calculation device 1 computes the stress distributions B on the basis of the operation data D20 and the manufacture data D21 of the gas turbine G (step S20). Hereinafter, the process of step S20 performed by the stress distribution computation unit 20 will be described in detail with reference to FIG. 5 to FIG. 9.

Figure 5:
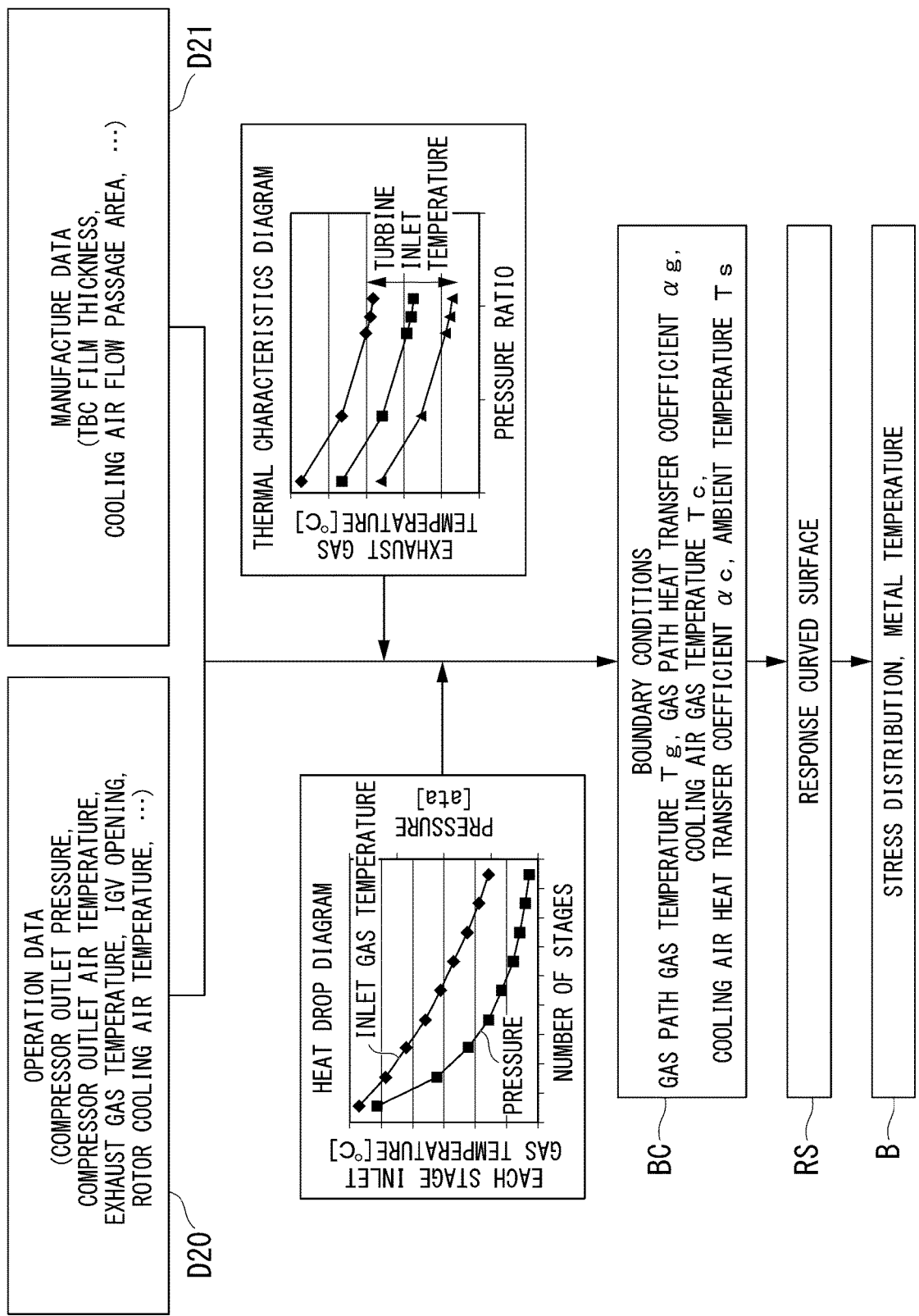
FIG. 5 is a third diagram for describing processing of the damage probability calculation device according to the first embodiment in detail.

FIG. 5 shows a flow through which the stress distributions B are acquired from the operation data D20 and the manufacture data D21 through processing of the stress distribution computation unit 20. As shown in FIG. 5, first, the stress distribution computation unit 20 acquires the operation data D20 and the manufacture data D21 of the gas turbine G.

The operation data D20 is an information group representing an operating state of the gas turbine G during operation and is a compressor outlet pressure, a compressor outlet air temperature, an exhaust gas temperature, an IGV opening, a rotor cooling air temperature, and the like, for example. The operation data D20 is sequentially acquired as result data through a sensor group and the like installed inside the gas turbine G The sensor group and the like installed inside the gas turbine G are connected to the damage probability calculation device 1 and configured to transmit electrical signals representing the operation data D20 to the damage probability calculation device 1.

Figure 6:
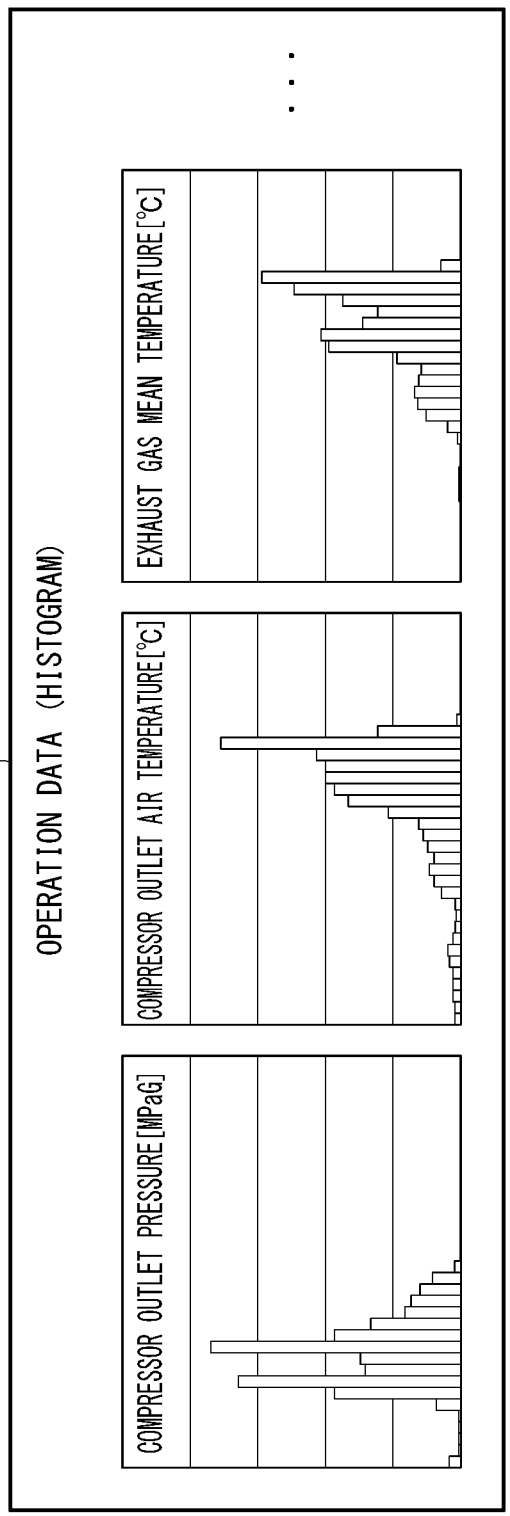
FIG. 6 is a fourth diagram for describing processing of the damage probability calculation device according to the first embodiment in detail.

FIG. 6 is histograms of the operation data D20 received and acquired by the damage probability calculation device 1. A histogram represents a numerical value range of each piece of the operation data D20 on the horizontal axis and represents a frequency of occurrence of each numerical value range during operation of the gas turbine on the vertical axis. The stress distribution computation unit 20 computes distributions (the mean, the standard deviation and a certainty factor) of the operation data D20 as represented in the histograms of FIG. 6.

The manufacture data D21 is an information group pertaining to a dimensional tolerance and the like of the gas turbine G For example, the manufacture data D21 is a thermal barrier coating (TBC) film thickness, a cooling air flow passage area, and the like and is measured data with respect to a plurality of gas turbine bodies.

Figure 7:
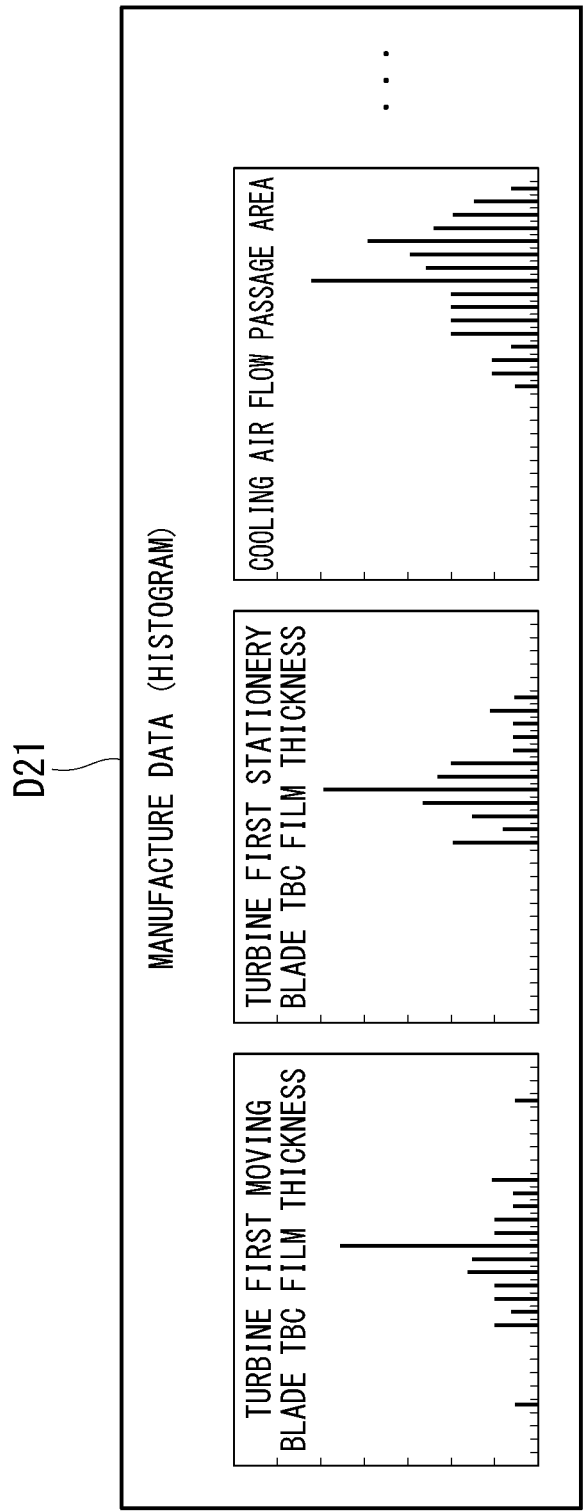
FIG. 7 is a fifth diagram for describing processing of the damage probability calculation device according to the first embodiment in detail.

FIG. 7 is histograms of the acquired manufacture data D21. The stress distribution computation unit 20 computes distributions (the mean, the standard deviation and a certainty factor) of the manufacture data D21 as shown in the histograms of FIG. 7.

Meanwhile, distributions including certainty factors with respect to the operation data D20 and the manufacture data D21 can be obtained in the same procedure as that used to obtain the strength distributions A (FIG. 4). That is, the stress distribution computation unit 20 applies a sample mean of respective pieces of the operation data D20 or the manufacture data D21 to "$\mu_0$" of expression (2). In addition, the stress distribution computation unit 20 applies a sample variance of respective pieces of the operation data D20 or the manufacture data D21 to "$\sigma^2$" of expression (2). Further, the stress distribution computation unit 20 applies the number of pieces of data of each of the pieces of the operation data D20 or the manufacture data D21 to "$n_0$" of expression (2). In addition, the stress distribution computation unit 20 applies the number of pieces of data of each of the pieces of the operation data D20 or the manufacture data D21 to "$v_0$" of expression (3). Further, the stress distribution computation unit 20 applies a sample variance $\sigma^2 \times v_0$ of respective pieces of the operation data D20 or the manufacture data D21 to "$\lambda_0$" of expression (3).

Next, the stress distribution computation unit 20 specifies boundary conditions BC on the basis of the operation data D20 and the manufacture data D21. The boundary conditions are conditions to be set on the surface (boundary) of an analysis model of the evaluation target region g when finite element (FEM) analysis is performed using the analysis model. For example, when the evaluation target region g is a moving blade or a stationary blade, boundary conditions BC including a gas path gas temperature and a gas path heat transfer coefficient are set on a gas path face of an analysis model thereof. In addition, boundary conditions BC including a cooling air gas temperature and a cooling air heat transfer coefficient are set on a cooling air flow face of the analysis model. Further, a boundary condition BC including an ambient temperature $T_S$ is set on surfaces other than the gas path face and the cooling air flow face of the analysis model.

The stress distribution computation unit 20 computes the boundary conditions BC by applying a thermal characteristics diagram and a heat drop diagram with respect to the gas turbine G to the operation data D20 and the manufacture data D21. The thermal characteristics diagram is design data and the like acquired in advance with respect to the gas turbine G and is a characteristic diagram showing a relationship between an exhaust gas temperature, a pressure ratio and a turbine inlet temperature. In addition, the heat drop diagram is design data and the like acquired in advance with respect to the gas turbine G and is a characteristic diagram showing variations in a gas temperature and pressure for the number of stages of each blade.

For example, the stress distribution computation unit 20 applies the operation data D20 of "compressor outlet pressure" and "exhaust gas temperature" to the thermal characteristics diagram of the gas turbine G to acquire "turbine inlet temperature." In addition, the stress distribution computation unit 20 applies the heat drop diagram to the acquired turbine inlet temperature to acquire a gas path gas temperature $T_g$ that is one of the boundary conditions BC with respect to the evaluation target region g (moving blade or stationery blade). Further, the stress distribution computation unit 20 applies the thermal characteristics diagram and the heat drop diagram to the operation data D20 of "compressor outlet pressure" and "exhaust gate temperature" to acquire "inlet pressure" of the evaluation target region g, for example. In addition, the stress distribution computation unit 20 applies "TBC film thickness" of the manufacture data D21 and an expression of a turbulence flat plate to the "inlet pressure" of the evaluation target region g to acquire a gas path heat transfer coefficient $\alpha g$ which is one of the boundary conditions BC with respect to the evaluation target region g. The stress distribution computation unit 20 acquires other boundary conditions BC using the various types of operation data D20 and manufacture data D21 in the same manner.

Meanwhile, there are cases in which values of the operation data D20 and the manufacture data D21 can be applied as the corresponding boundary conditions BC depending on the types of the boundary conditions BC. In this case, the stress distribution computation unit 20 may use values of the operation data D20 as boundary conditions BC (input to a response curved surface RS which will be described later) as they are.

Figure 8:
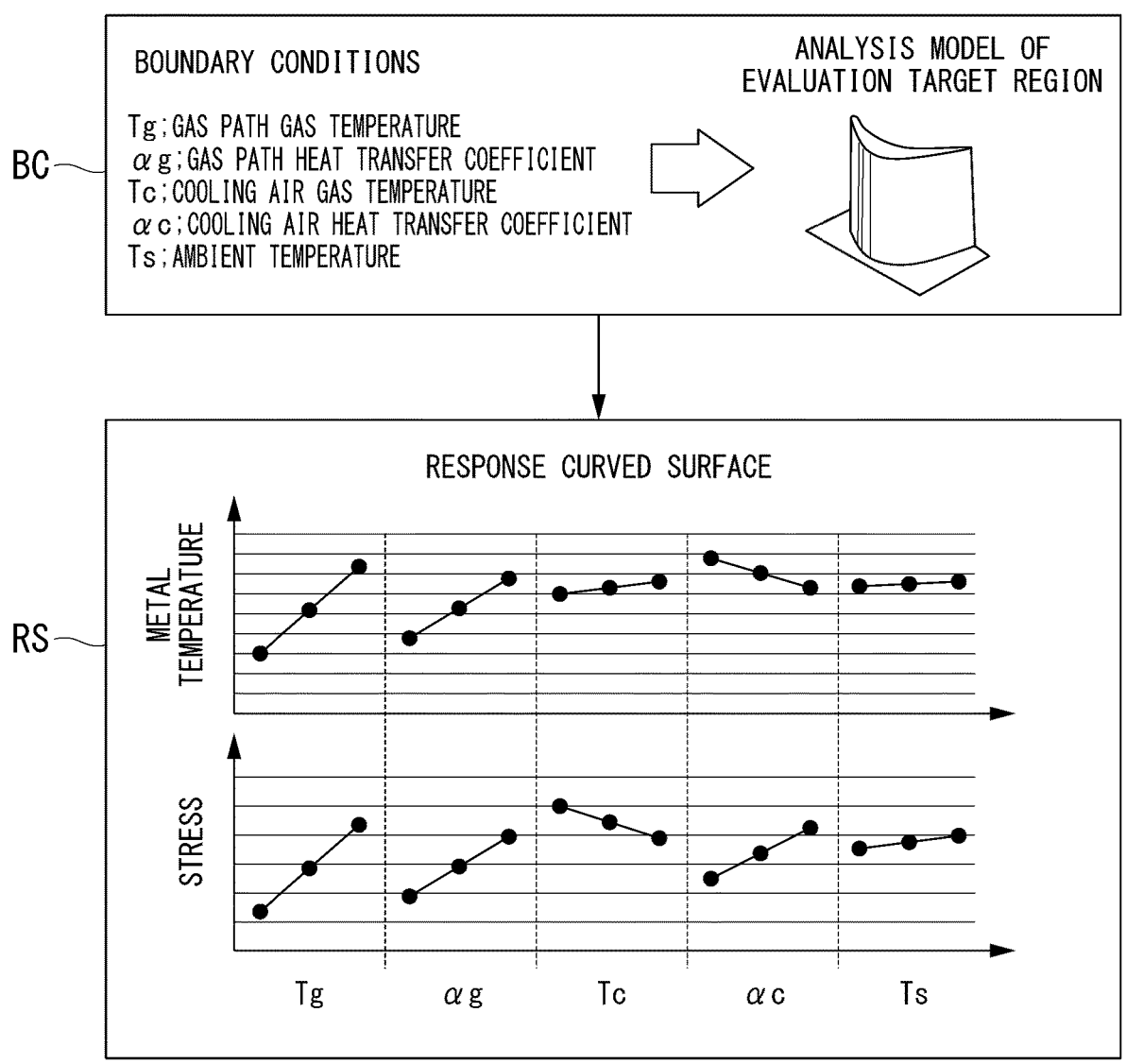
FIG. 8 is a sixth diagram for describing processing of the damage probability calculation device according to the first embodiment in detail.
Figure 9:
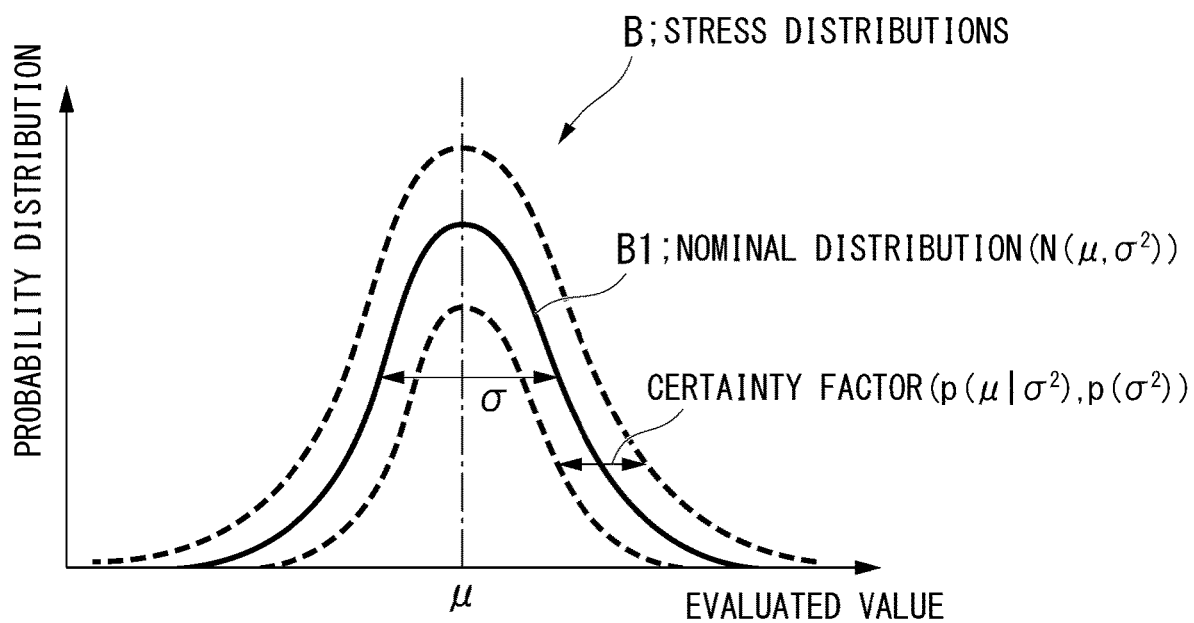
FIG. 9 is a seventh diagram for describing processing of the damage probability calculation device according to the first embodiment in detail.

The stress distribution computation unit 20 inputs boundary conditions BC to the response curved surface RS which has been prepared in advance according to FEM analysis for the analysis model of the evaluation target region g. The response curved surface RS is a function which defines an evaluated value (a stress or a metal temperature) input to the evaluation target region g as a response to boundary conditions BC when the boundary conditions BC have been provided for the analysis model of the evaluation target region g. Specifically, the response curved surface RS has respective boundary conditions (the gas path gas temperature Tg, gas path heat transfer coefficient αg, cooling air gas temperature $T_C$, cooling air heat transfer coefficient ac and ambient temperature $T_S$) as factors and defines an evaluated value (a stress or a metal temperature) which is a response to each factor, as shown in FIG. 8.

The stress distribution computation unit 20 computes distributions (the mean, the standard deviation and a certainty factor) of the boundary conditions BC from distributions (the mean, the standard deviation and a certainty factor) of the operation data D20 and distributions (the mean, the standard deviation and a certainty factor) of the manufacture data D21 and inputs the distributions of the boundary conditions BC to the response curved surface RS. In this manner, the stress distribution computation unit 20 computes the stress distributions B shown in FIG. 9. The stress distributions B indicate the mean, the standard deviation and a certainty factor of evaluated values (stresses or metal temperatures) input to the evaluation target region g on the basis of operation of the gas turbine G represented by the acquired operation data D20 and manufacture data D21.

(Detailed Description of Processing of Damage Probability Distribution Computation Unit)

Referring back to FIG. 2, next, the damage probability distribution computation unit 30 of the damage probability calculation device 1 computes damage probability distributions C indicating distributions of damage probabilities of the evaluation target region g on the basis of the strength distributions A and the stress distributions B (step S30). Hereinafter, the process of step S30 performed by the damage probability distribution computation unit 30 will be described in detail with reference to FIGS. 10 and 11.

Figure 10:
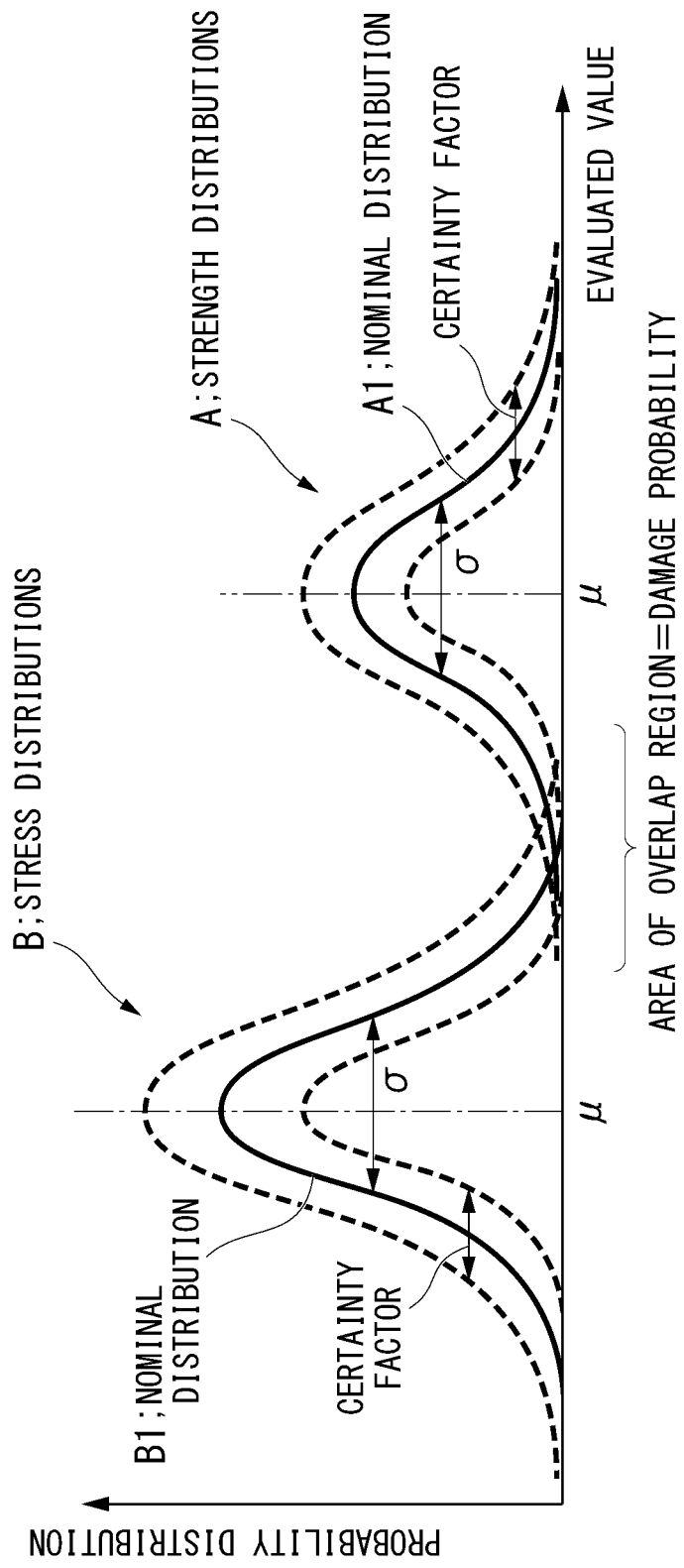
FIG. 10 is an eighth diagram for describing processing of the damage probability calculation device according to the first embodiment in detail.

As shown in FIG. 10, the damage probability distribution computation unit 30 computes the area of an overlap region of the strength distributions A computed in step S10 and the stress distributions B computed in step S20. Here, the area of the overlap region of the nominal distribution A1 of the strength distributions A and the nominal distribution B1 of the stress distributions B indicates a probability (damage probability) of the evaluation target region g being damaged. In addition, the damage probability distribution computation unit 30 computes a distribution (damage probability distribution) of damage probabilities from a minimum damage probability (a damage probability when the strength distributions A are farthest away from the stress distributions B) to a maximum damage probability (a damage probability when the strength distributions A are closest to the stress distributions B) in consideration of the certainty factors (ranges indicated by dotted lines) of the strength distributions A and the stress distributions B.

The relationship between the strength distributions A and the stress distributions B shown in FIG. 10 is a damage probability at the point in time at which the operation data D20 and the manufacture data D21 are obtained. This is computed for each number of operating cycles in the following operations and a transition of the damage probability distributions C with respect to the number of operating cycles is calculated. In the present embodiment, the damage probability calculation device 1 is electrically connected to a controller of the machine and configured to change the operation or operating conditions of the machine on the basis of the computed damage probability distributions C. Specifically, the damage probability calculation device 1 transmits, for example, an electrical signal for instructing the machine in operation to be stopped, an electrical signal for instructing operating conditions to be changed to more appropriate operating conditions, or the like to the controller of the machine on the basis of the computed damage probability distributions C. In other embodiments, the damage probability calculation device 1 may be connected to a display unit. In this case, the damage probability calculation device 1 may propose an operation or operating conditions of the machine, to which the machine should be changed, on the basis of the computed damage probability distributions C.

Figure 11:
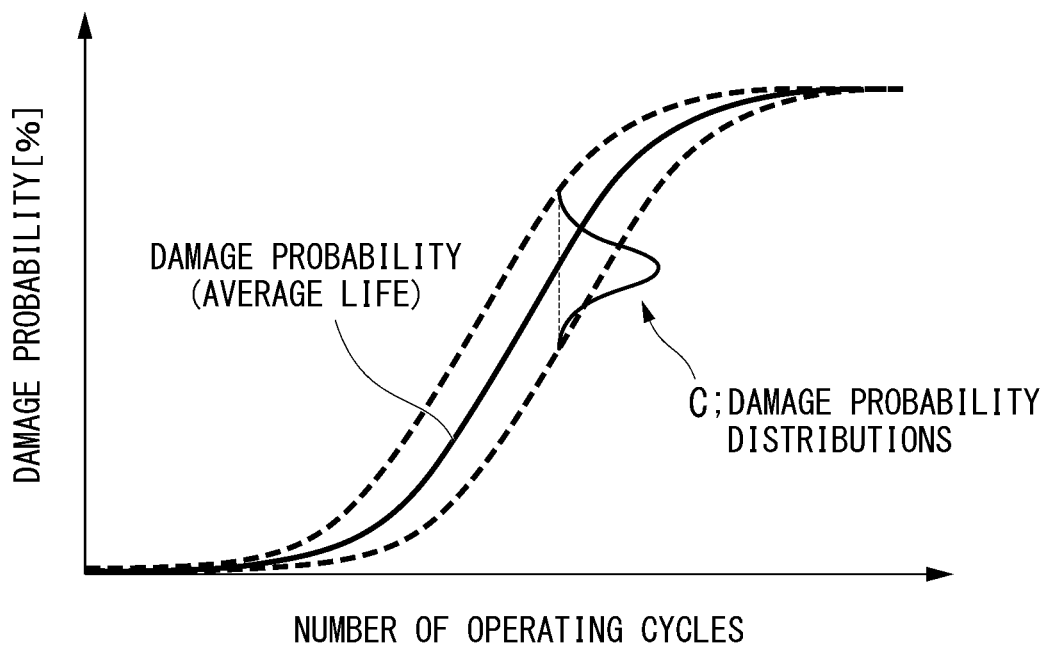
FIG. 11 is a ninth diagram for describing processing of the damage probability calculation device according to the first embodiment in detail.

A curve indicated by a solid line in FIG. 11 is a transition of damage probabilities with respect to the number of operating cycles and corresponds to the area of the overlap region of the nominal distributions A1 and B1 of FIG. 10. In addition, curves indicated by dotted lines in FIG. 11 correspond to the areas of overlap regions of the distributions indicated by dotted lines in FIG. 10 and represent a transition from a minimum damage probability to a maximum damage probability.

Meanwhile, the operation data D20 is sequentially acquired during operation of the gas turbine G. The stress distribution computation unit 20 sequentially performs update (Bayes update) of respective parameters to be applied to expressions (2) and (3) on the basis of newly obtained operation data D20. Accordingly, the stress distributions B which are prior distributions are updated into posterior distributions whenever operation data D20 is newly acquired and the number of pieces of the data increases.

Further, when the manufacture data D21 has been newly acquired, the stress distribution computation unit 20 may update respective parameters to be applied to expressions (2) and (3) on the basis of the newly acquired manufacture data D21 in the same manner as the above one.

Further, when the strength test data D10 of the material M has been newly obtained, the strength distribution computation unit 10 may update respective parameters to be applied to expressions (2) and (3) on the basis of the newly obtained strength test data 10 in the same manner as the above one. Accordingly, update from prior distributions to posterior distributions is performed with respect to the strength distributions A of the mean μ and the standard deviation σ whenever the strength test data D10 is newly acquired and the number of pieces of the data increases.

(Action and Effect)

As described above, the damage probability calculation device 1 according to the first embodiment computes strength distributions A including a mean, a standard deviation and a certainty factor and the stress distributions B including a mean, a standard deviation and a certainty factor. In addition, the damage probability calculation device 1 computes a damage probability from the area of an overlap region of the strength distributions A and the stress distributions B including the certainty factors and computes damage probability distributions C indicating an uncertainty distribution of the damage probability.

Accordingly, not only a damage probability but also the uncertainty thereof can be detected and thus appropriate maintenance management according to risk becomes possible. That is, it is possible to reduce maintenance costs by reducing component purchase costs and optimizing a periodic inspection interval.

Other Embodiments

Although the damage probability calculation device 1 according to the first embodiment has been described in detail above, specific aspects of the damage probability calculation device 1 are not limited to the above-described one and various design modifications may be applied thereto without departing from the scope of the present disclosure.

For example, although the damage probability calculation device 1 according to the first embodiment computes the damage probability distributions C for the current number of operating cycles on the basis of only the operation data D20 and the manufacture data D21 (result data) actually measured at this point in time in the above description, the present disclosure is not limited to this aspect in other embodiments.

The damage probability calculation device 1 according to other embodiments may have a function of predicting damage probability distributions C in the future (for example, after 200 cycles, or the like) by performing the Monte Carlo simulation based on distributions of operation data D20 and manufacture data D21 (result data) which have already been acquired. In this case, the damage probability calculation device 1 may input operation data for more severe condition (for example, operation data obtained by adding +20° C. to an exhaust gas temperature) than the actual operation data D20. Accordingly, life prediction can be performed more safely. In this case, the damage probability calculation device 1 may be configured to transmit an electrical signal which is an instruction for changes for instructing an operation or operating conditions of the machine to be changed to the controller of the machine on the basis of the predicted damage probability distributions C.

In addition, although the damage probability calculation device 1 computes a transition of the damage probability distributions C with respect to the number of operating cycles in the first embodiment, the present disclosure is not limited to this aspect in other embodiments. For example, when a considerable load change has occurred in one operating cycle, it is conceivable that a damage degree will progress according to load changes during operation in addition to load changes input when operation is started/ended. Accordingly, the damage probability calculation device 1 may specify a transition of damage probability distributions C with respect to the actual number of load changes as well as a transition of damage probability distributions C with respect to the number of operating cycles.

Although the damage probability calculation device 1 according to the first embodiment has been described through an example of computing the damage probability distributions C indicating distributions of damage probabilities of the evaluation target region g according to comparison between the strength distributions A which are probability distributions of the strength of the material M of the evaluation target region g with respect to stresses and the stress distributions B which are distributions of stresses input to the evaluation target region g, the present disclosure is not limited to this aspect in other embodiments.

For example, the damage probability calculation device 1 according to other embodiments may compute the damage probability distributions C indicating distributions of damage probabilities of the evaluation target region g according to comparison between strength distributions A' which are probability distributions of the strength of the material M of the evaluation target region g with respect to metal temperatures and temperature distributions B' which are distributions of metal temperatures input to the evaluation target region g.

More specifically, a strength distribution computation unit 10' of the damage probability calculation device 1 according to other embodiments computes strength distributions A' including the mean, the standard deviation and a certainty factor of the strength of the material M used for the evaluation target region g with respect to metal temperatures on the basis of strength test data D10' which is test results of the strength of the material M with respect to the metal temperatures.

In addition, a temperature distribution computation unit 20' computes temperature distributions B' including the mean, the standard deviation and a certainty factor of metal temperatures input to the evaluation target region g on the basis of the operation data D20 and the manufacture data D21 of the gas turbine G.

A damage probability distribution calculation unit 30' computes damage probability distributions C' indicating distributions of damage probabilities of the evaluation target region g on the basis of the strength distributions A' and the temperature distributions B'.

(Computer Configuration)

Figure 12:
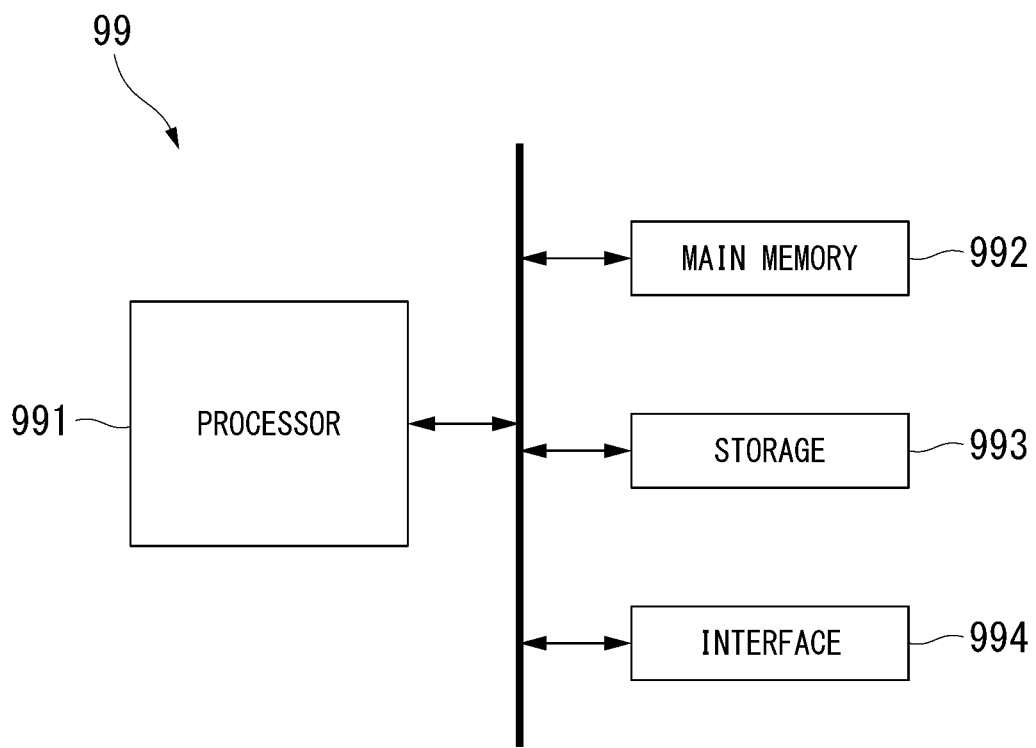
FIG. 12 is a diagram showing a configuration of a computer of a damage probability calculation device according to each embodiment.

FIG. 12 is a diagram showing a configuration of a computer of the damage probability calculation device according to each of the above-described embodiments.

A computer 99 includes a processor 991, a main memory 992, a storage 993 and an interface 994.

The above-described damage probability calculation device 1 according to the first embodiment includes the computer 99. Each functional unit included in the damage probability calculation device 1 is stored in the storage 993 as a program. The processor 991 executes functions as various functional units shown in FIG. 1 by reading programs from the storage 993, loading the programs in the main memory 992 and being operated according to the programs. The storage 993 is an example of non-temporary tangible media. As other examples of non-temporary tangible media, an optical disk, a magnetic disk, a magneto-optical disc and a semiconductor memory connected through the interface 994 are conceivable.

Programs may be transmitted to the computer 99 through a network. In this case, the computer 99 loads the transmitted programs in the main memory 992 and executes the aforementioned processes. The programs may be for the purpose of realizing some of the above-described functions. For example, the programs may realize the above-described functions according to combination with other programs which have already been stored in the storage 993 or combination with other programs installed in other devices. In addition, some of the above-described functions may be executed by other devices connected through a network. That is, the above-described functions may be realized according to cloud computing, grid computing, cluster computing or other parallel computing.

The computer 99 may include a programmable logic device (PLD) in addition to or instead of the aforementioned components. As examples of the PLD, a programmable array logic (PAL) device, a generic array logic (GAL) device, a complex programmable logic device (CPLD), and a field programmable gate array (FPGA) are conceivable.

In addition, according to a second aspect of the present disclosure, the strength distribution computation unit and the stress distribution computation unit are configured to obtain the respective certainty factors according to the Bayes estimation.

Further, according to a third aspect of the present disclosure, the stress distribution computation unit is configured to update the stress distributions which are prior distributions into posterior distributions whenever the number of pieces of data of the operation data increases.

In addition, according to a fourth aspect of the present disclosure, the strength distribution computation unit is configured to update the strength distributions which are prior distributions into posterior distributions whenever the number of pieces of data of the test data increases.

Further, according to a fifth aspect of the present disclosure, the stress distribution computation unit is configured to compute the stress distributions on the basis of the operation data and the manufacture data of the machine.

In addition, according to a sixth aspect of the present disclosure, the stress distribution computation unit is configured to compute boundary conditions with respect to the analysis model of the evaluation target region from the operation data and compute the stress distributions on the basis of a response curved surface indicating a response of the stresses to the boundary conditions.

Further, according to a seventh aspect of the present disclosure, a damage probability calculation method is a damage probability calculation method for predicting a damage probability in an evaluation target region of a machine, which includes computing strength distributions including the mean, the standard deviation and a certainty factor of the strength of a material used for the evaluation target region on the basis of test data of the strength of the material, computing stress distributions including the mean, the standard deviation and a certainty factor of stresses input to the evaluation target region on the basis of operation data of the machine acquired through a sensor, and computing damage probability distributions indicating distributions of damage probabilities of the evaluation target region on the basis of the strength distributions and the stress distributions.

In addition, according to an eighth aspect of the present disclosure, a non-transient computer-readable medium stores a program which causes a computer of a damage probability calculation device for predicting a damage probability in an evaluation target region of a machine to execute a step of computing strength distributions including a mean, a standard deviation and a certainty factor of the strength of a material used for the evaluation target region on the basis of test data of the strength of the material, a step of computing stress distributions including the mean, the standard deviation and the certainty factor of stresses input to the evaluation target region on the basis of operation data of the aforementioned machine acquired through a sensor, and a step of computing damage probability distributions indicating a damage probability of the evaluation target region and a probability distribution thereof on the basis of the strength distributions and the stress distributions.

Further, according to a ninth aspect of the present disclosure, a damage probability calculation device is a damage probability calculation device for calculating a damage probability in an evaluation target region of a machine, which includes a strength distribution computation unit configured to compute strength distributions including a mean, a standard deviation and a certainty factor of the strength of a material used for the evaluation target region on the basis of test data of the strength of the material with respect to temperatures, a temperature distribution computation unit configured to compute temperature distributions including the mean, the standard deviation and the certainty factor of temperatures input to the evaluation target region on the basis of operation data of the machine acquired through a sensor, and a damage probability distribution computation unit configured to compute damage probability distributions indicating distributions of damage probabilities of the evaluation target region on the basis of the strength distributions and the temperature distributions.

While several embodiments pertaining to the present disclosure have been described above, these embodiments are exemplary and do not intend to limit the scope of the invention. These embodiments can be implemented in various other forms and various omissions, substitutions and modifications can be made without departing from the spirit or scope of the invention. These embodiments and modifications thereof are included in the scope of the invention described in the claims and equivalents thereof as being included in the scope and sprint of the invention.

REFERENCE SIGNS LIST

1 Damage probability calculation device
10 Strength distribution computation unit
20 Stress distribution computation unit
30 Damage probability distribution computation unit

The invention claimed is:

1. A damage probability calculation device for calculating a damage probability in an evaluation target region of a machine, comprising:
   a strength distribution computation unit configured to compute strength distributions, including a mean, a standard deviation and a certainty factor, of the strength of a material used for the evaluation target region, based on test data of the strength of the material with respect to stresses;
   a stress distribution computation unit configured to compute stress distributions of stresses input to the evaluation target region based on operation data of the machine acquired through a sensor, the stress distributions including the mean, the standard deviation and the certainty factor of the stresses input to the evaluation target region; and
   a damage probability distribution computation unit configured to compute damage probability distributions indicating distributions of damage probabilities of the evaluation target region based on the strength distributions and the stress distributions,
   wherein the strength distribution calculation unit and the stress distribution calculation unit are configured to obtain the respective certainty factors according to the Bayes estimation,
   and wherein the strength distribution computation unit is configured to update the strength distributions, which are prior distributions, into posterior distributions whenever the number of pieces of data of the test data increases.

2. The damage probability calculation device according to claim 1, wherein the stress distribution computation unit is configured to compute the stress distributions based on the operation data and manufacture data of the machine.

3. The damage probability calculation device according to claim 1, wherein the stress distribution computation unit is configured to compute boundary conditions with respect to an analysis model of the evaluation target region from the operation data and compute the stress distributions based on a response curved surface indicating a response of the stresses to the boundary conditions.

4. A damage probability calculation method for predicting a damage probability in an evaluation target region of a machine, comprising:
- computing strength distributions, including the mean, the standard deviation and a certainty factor, of the strength of a material used for the evaluation target region, based on test data of the strength of the material;
- computing stress distributions, including the mean, the standard deviation and a certainty factor, of stresses input to the evaluation target region, based on operation data of the machine acquired through a sensor;
- computing damage probability distributions indicating distributions of damage probabilities of the evaluation target region based on the strength distributions and the stress distributions; and
- updating the strength distributions, which are prior distributions, into posterior distributions whenever the number of pieces of data of the test data increases,
- wherein in the computing of the strength distributions and the computing of the stress distributions, the respective certainty factors are computed according to the Bayes estimation.

* * * * *